US008522658B2

(12) United States Patent
Frolov

(10) Patent No.: US 8,522,658 B2
(45) Date of Patent: Sep. 3, 2013

(54) GUARD SYSTEMS FOR TABLE SAW

(75) Inventor: Andrew Frolov, Glenview, IL (US)

(73) Assignee: Robert Bosch GmbH, Stuttgart (DE)

(*) Notice: Subject to any disclaimer, the term of this patent is extended or adjusted under 35 U.S.C. 154(b) by 327 days.

(21) Appl. No.: 12/856,575

(22) Filed: Aug. 13, 2010

(65) Prior Publication Data

US 2012/0036976 A1 Feb. 16, 2012

(51) Int. Cl.

| | |
|---|---|
| ***B23D 33/02*** | (2006.01) |
| ***B26D 1/14*** | (2006.01) |
| ***B26D 5/08*** | (2006.01) |
| ***B27B 13/00*** | (2006.01) |
| ***B27G 19/00*** | (2006.01) |
| ***B25H 1/00*** | (2006.01) |

(52) U.S. Cl.

USPC .................... 83/473; 83/478; 83/544; 83/860; 144/251.1; 144/287

(58) Field of Classification Search

USPC ................ 83/102, 477.2, 473, 478, 544, 520, 83/860, 581; 144/251.1, 251.3, 266.5, 287, 144/253.3

See application file for complete search history.

(56) References Cited

U.S. PATENT DOCUMENTS

| | | | | |
|---|---|---|---|---|
| 2,425,331 | A * | 8/1947 | Kramer | 83/478 |
| 2,695,638 | A * | 11/1954 | Gaskell | 83/477 |
| 4,063,478 | A * | 12/1977 | Stuy | 83/100 |
| 4,241,505 | A * | 12/1980 | Bodycomb et al. | 30/390 |
| 4,255,995 | A * | 3/1981 | Connor | 83/100 |
| 4,385,539 | A | 5/1983 | Meyerhoefer et al. | |
| 4,494,433 | A * | 1/1985 | Gerber | 83/374 |
| 4,721,023 | A * | 1/1988 | Bartlett et al. | 83/100 |
| 4,896,572 | A * | 1/1990 | Smyth et al. | 83/100 |
| 4,962,685 | A | 10/1990 | Hagstrom | |
| 5,158,001 | A | 10/1992 | Udelhofen et al. | |
| 5,181,447 | A | 1/1993 | Hewitt | |

(Continued)

FOREIGN PATENT DOCUMENTS

| | | |
|---|---|---|
| DE | 4244149 A1 | 6/1994 |
| EP | 1422022 A1 | 5/2004 |
| FR | 2495523 A1 | 6/1982 |

OTHER PUBLICATIONS

International Search Report in corresponding PCT Application (i.e., PCT/US2011/046875), mailed Nov. 11, 2011 (12 pages).

(Continued)

*Primary Examiner* — Ghassem Alie
*Assistant Examiner* — Bharat C Patel
(74) *Attorney, Agent, or Firm* — Maginot, Moore & Beck

(57) ABSTRACT

A table saw is disclosed. The table saw includes a table top including an opening configured to receive a saw blade, a blade case positioned under the table top, the blade case including an interior portion with the saw blade partially positioned within the interior portion, the blade case configured to move relative to the table top, a motor coupled to the saw blade and configured to move relative to the table top, the saw motor configured to rotate the blade about a blade axis, and at least one moveable guard member positioned between the table top and the blade case, the at least one moveable guard member providing an obstruction to the interior portion of the blade case, and the at least one moveable guard member configured to pivot about a pivot axis when the motor is moved up or down or tilted relative to the table top, wherein the pivot axis is substantially perpendicular to the blade axis.

8 Claims, 11 Drawing Sheets

(56) References Cited

U.S. PATENT DOCUMENTS

| | | | | |
|---|---|---|---|---|
| 6,009,782 | A | 1/2000 | Tajima et al. | |
| 6,131,629 | A * | 10/2000 | Puzio et al. | 144/252.1 |
| 6,578,460 | B2 | 6/2003 | Sartori | |
| 6,966,350 | B1 | 11/2005 | Gist | |
| 6,986,370 | B1 * | 1/2006 | Schoene et al. | 144/287 |
| 7,210,386 | B1 * | 5/2007 | Chang | 83/477.2 |
| 7,302,878 | B2 | 12/2007 | Chang | |
| 7,350,444 | B2 | 4/2008 | Gass et al. | |
| 7,458,301 | B2 * | 12/2008 | Yu | 83/102.1 |
| 8,393,939 | B2 * | 3/2013 | Chianese et al. | 451/453 |
| 2005/0087049 | A1 * | 4/2005 | Miller et al. | 83/440.2 |
| 2005/0139057 | A1 | 6/2005 | Gass et al. | |
| 2005/0188807 | A1 * | 9/2005 | Parks et al. | 83/473 |
| 2008/0053284 | A1 * | 3/2008 | Miller et al. | 83/446 |
| 2008/0289467 | A1 * | 11/2008 | Skillings et al. | 83/169 |
| 2010/0024620 | A1 * | 2/2010 | Arvey | 83/397 |

OTHER PUBLICATIONS

Amazon website page "DeWalt DW745 Heavy-Duty 10-Inch Compact Job-Site Table Saw with 16-Inch Max Rip Capacity"; http://www.amazon.com . . . ; published at least as early as Aug. 10, 2010; (1 page).

Amazon website page "Hitachi C10RB 10-Inch Portable Jobsite Table Saw with Stand"; http://www.amazon.com . . . ; published at least as early as Aug. 10, 2010; (1 page).

Amazon website page "Makita 2704 Contractors 15 Amp 10-Inch Benchtop Table Saw"; http://www.amazon.com . . . : published at least as early as Aug. 10, 2010; (1 page).

Amazon website page "Metabo TS250 10-Inch Table Saw without Stand": http://www.amazon.com . . . ; published at least as early as Aug. 10, 2010; (1 page).

* cited by examiner

GUARD SYSTEMS FOR TABLE SAW

FIELD

The invention relates to a power table saw, and in particular to guard structures that limit access to internal components and compartments of the table saw.

BACKGROUND

Table saws are used in the construction and wood milling industries. An example of a prior art table saw 400 is depicted in FIG. 13. The table saw 400 includes a table top 402 with a saw blade opening 404 formed therein for receiving a saw blade 406. The saw blade 406 is coupled to a motor 440 which is positioned below the table top 402. The motor 440 is moveably mounted to an enclosure 460. The saw blade 406 is partially positioned within the enclosure 460. The table top 402 is supported by legs 410 which can be in a form of a housing.

The motor 440 is configured to move along arrows U-U, in order to move the saw blade 406 up and down with respect to the enclosure 460 and also with respect to the table top 402. The enclosure 460 is also configured to move about an arcuate path defined by arrows W-W, such that the motor 440 and the saw blade 406 attached thereto can bevel with respect to the table top 402.

Depicted in FIG. 13 is an air gap 412 between the enclosure 460 and bottom side of the table top 402. The air gap 412 is provided in order for the enclosure 460 to have sufficient space to bevel with respect to the table top 402. The air gap 412 may be sufficiently large to allow a user to reach inside the space defined by the air gap 412 and thereby touch internal components of the table saw 400.

Therefore, it is highly desirable to provide guard systems which minimize the ability of the user to reach inside the space defined by the air gap between the enclosure and the bottom of the table top.

SUMMARY

According to one embodiment of the present disclosure, there is provided a table saw. The table saw includes a table top including an opening configured to receive a saw blade, and a blade case positioned under the table top, the blade case including an interior portion with the saw blade partially positioned within the interior portion, the blade case configured to move relative to the table top. The table saw also includes a motor coupled to the saw blade and configured to move relative to the table top, the saw motor configured to rotate the blade about a blade axis. The table saw further includes at least one moveable guard member positioned between the table top and the blade case, the at least one moveable guard member providing an obstruction to the interior portion of the blade case, and the at least one moveable guard member configured to pivot about a pivot axis when the motor is moved up or down or tilted relative to the table top, wherein the pivot axis is substantially perpendicular to the blade axis.

According to another embodiment of the present disclosure, there is provided a table saw. The table saw includes a table top including an opening configured to receive a saw blade, and a blade case positioned under the table top, the blade case including an interior portion with the saw blade partially positioned within the interior portion. The table saw also includes a motor coupled to the saw blade, the motor configured to move relative to the table top between an upright position and a tilted position. The table saw further includes at least one moveable guard member positioned between the table top and the blade case, the at least one moveable guard member providing an obstruction to the interior portion of the blade case, and the at least one moveable guard member configured to pivot relative to the blade case when the motor is moved between the upright position and the tilted position.

According to another embodiment of the present disclosure, there is provided a table saw. The table saw includes a table top including an opening configured to receive a saw blade and a blade case positioned under the table top, the blade case including an interior portion with the saw blade partially positioned within the interior portion. The table saw also includes a motor coupled to the saw blade, the motor configured to move relative to the table top along a vertical axis between an up position and a down position, and at least one pivotable guard member positioned between the table top and the blade case. The table saw further includes a torsion spring configured to bias the pivotable guard member to contact at least one of the blade case, the table top, and the motor.

DESCRIPTION

Figure 1:
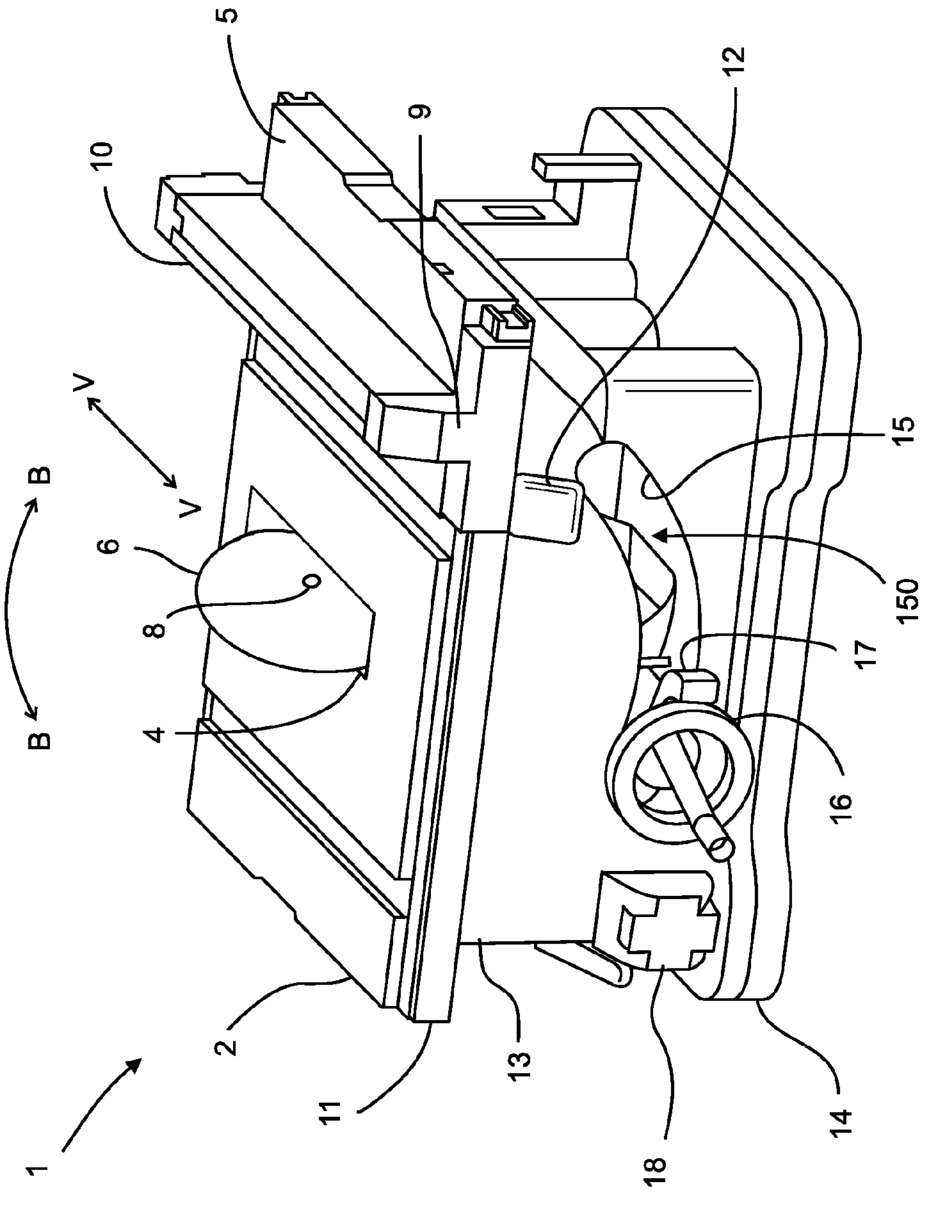
FIG. 1 depicts a perspective view of a table saw including a table top with a saw blade opening, a saw blade extending through the saw blade opening, and a support arrangement.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

The embodiments described in the present disclosure provide structures that limit access of a user to internal components of a table saw assembly when a motor of the table saw assembly is in different position.

General Table Saw Arrangement

Referring to FIG. 1, a table saw assembly 1 is depicted. The table saw assembly 1 includes a table top 2 which includes a saw blade opening 4. A saw blade 6 extends through the saw blade opening 4 and is configured to rotate about an axis passing through a coupling 8. A window is provided about the saw blade opening 4 to partially depict the saw blade 6 and the coupling 8, below the surface of the table top 2.

The table saw assembly 1 also includes a table extension 5 and a rip fence 10. The table extension 5 is coupled to the table top 2 via rails 11 and the lever lock 12. The rip fence 10 is coupled to the table top 2 or the table extension 5 via rails 11 and a lock 9. The lock 9 enables a user to lock the rip fence 10 in a stationary position with respect to the table top 2 and the rails 11.

The table saw assembly 1 further includes a housing 13 coupled to a base portion 14 and which includes an arcuate opening 15. The arcuate opening 15 receives a blade position adjustment mechanism which includes a wheel 16 for adjusting the height of the saw blade 6 about the table top 2 and a bevel adjustment lever 17 which controls the tilt or bevel angle of the saw blade 6 along an arcuate path B-B. There is also an on/off switch 18 depicted in FIG. 1 which provides power to the table saw assembly 1. Also, through the arcuate opening 15, a support arrangement 150 is depicted, which is further described below with reference to FIG. 2.

The table saw assembly 1 may be of a push-pull type where a workpiece to be shaped is placed on the table top 2 and remains stationary while the blade 6 is moved along an axis defined by arrows V-V. Alternatively, the table saw assembly 1 may of the type where the saw blade 6 remains stationary with respect to the axis defined by the arrows V-V, and the workpiece is moved toward the saw blade 6.

Figure 2:
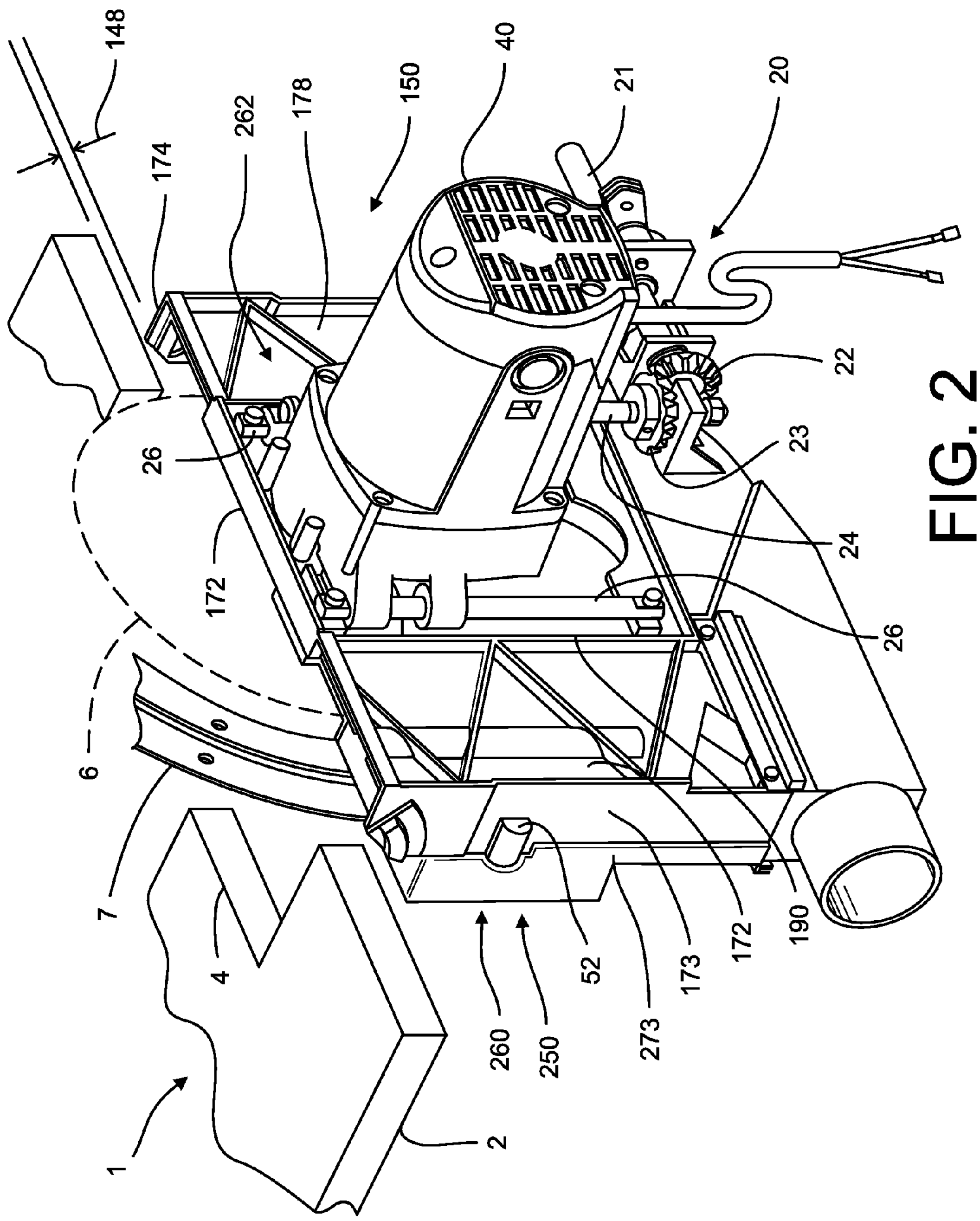
FIG. 2 depicts a perspective view of a blade case, a motor, a riving knife, and the table top of FIG. 1.

Referring to FIG. 2, a saw blade height adjustment mechanism 20 is depicted. The saw blade height adjustment mechanism 20 is known to a person of ordinary skill in the art and is therefore described herein, briefly. The saw blade height adjustment mechanism 20 includes a shaft 21 which is coupled to a beveled gear 22 which is coupled to another beveled gear 23. The beveled gear 23 is coupled to a rod 24 with a threaded portion 29 (see FIG. 5A) which interfaces with a threaded member 28 (shown in FIG. 3) which is fixedly coupled to a motor 40. The motor 40 glides on the glide rods 26. Accordingly, by turning the shaft 21, the threaded portion 29 of the rod 24 turns within the threaded member 28 which causes the motor 40, and the saw blade 6 attached thereto, to raise and lower with respect to the table top 2.

Also depicted in FIG. 2, is a perspective view of the support arrangement 150 coupled to a cover assembly 250. The cover assembly 250 couples to a support wall 172 of the support arrangement 150 with fastener assemblies 52. At one periphery of the support wall 172 is a side wall 173 and at another periphery is another side wall 174. The cover assembly 250 includes a side wall 273 which is positioned adjacent the side wall 173, another side wall (not shown) positioned opposite the side wall 273 and which is positioned adjacent the side wall 174, and a cover wall (not shown) which is positioned between the side walls 273 and 274. The side walls 173 and 174 are in the form of a flange that are integrally formed with and are substantially perpendicular to the support wall 172. Similarly, the side walls of the cover assembly 250 are in the form of a flange that are integrally formed with and are substantially perpendicular to the cover wall (not shown). The side wall 174, the periphery of the support wall 172 which joins the side wall 174, the side wall (not shown) of the cover assembly opposite to the side wall 273 and a periphery of the cover wall (not shown) are all arcuate in shape.

A combination of the support arrangement 150 and the cover assembly 250 form a blade case 260. The blade case 260 includes a blade chamber 262 which is defined by the support wall 172 on one side of the saw blade 6, the cover wall (not shown) on an opposite side of the saw blade 6, and the side walls of the support arrangement 150 and the cover assembly 250 which are along outer perimeters of the blade chamber 262. As the motor 40 is coupled to the glide rods 26 which are connected to the support wall 172 (i.e., part of the blade case 260), the motor is also coupled to the blade case 260. Accordingly, the saw blade 6 is partially positioned within the blade case 260 and within the blade chamber 262 and is configured to move vertically within the blade chamber 262. The support wall 172 and the cover wall 274 are separated by a space defined by the width of the side walls of the support arrangement 150 and the cover assembly 250, in which the blade chamber 262 is positioned.

Also depicted in FIG. 2 is a riving knife 7 which is positioned adjacent to the saw blade 6. Configuration and function of the riving knife 7 is known to a person of ordinary skill in the art.

The top edge of the wall 172 is separated by an air gap 148 from the bottom side of the table top 2. While some of the structures described in the present disclosure are directed to limiting access of a user to internal compartments of the table saw defined by the space defined by the air gap 148, some of the other structures are directed to limiting access of the user to the space adjacent the motor 40.

Guard Systems

Figure 3:
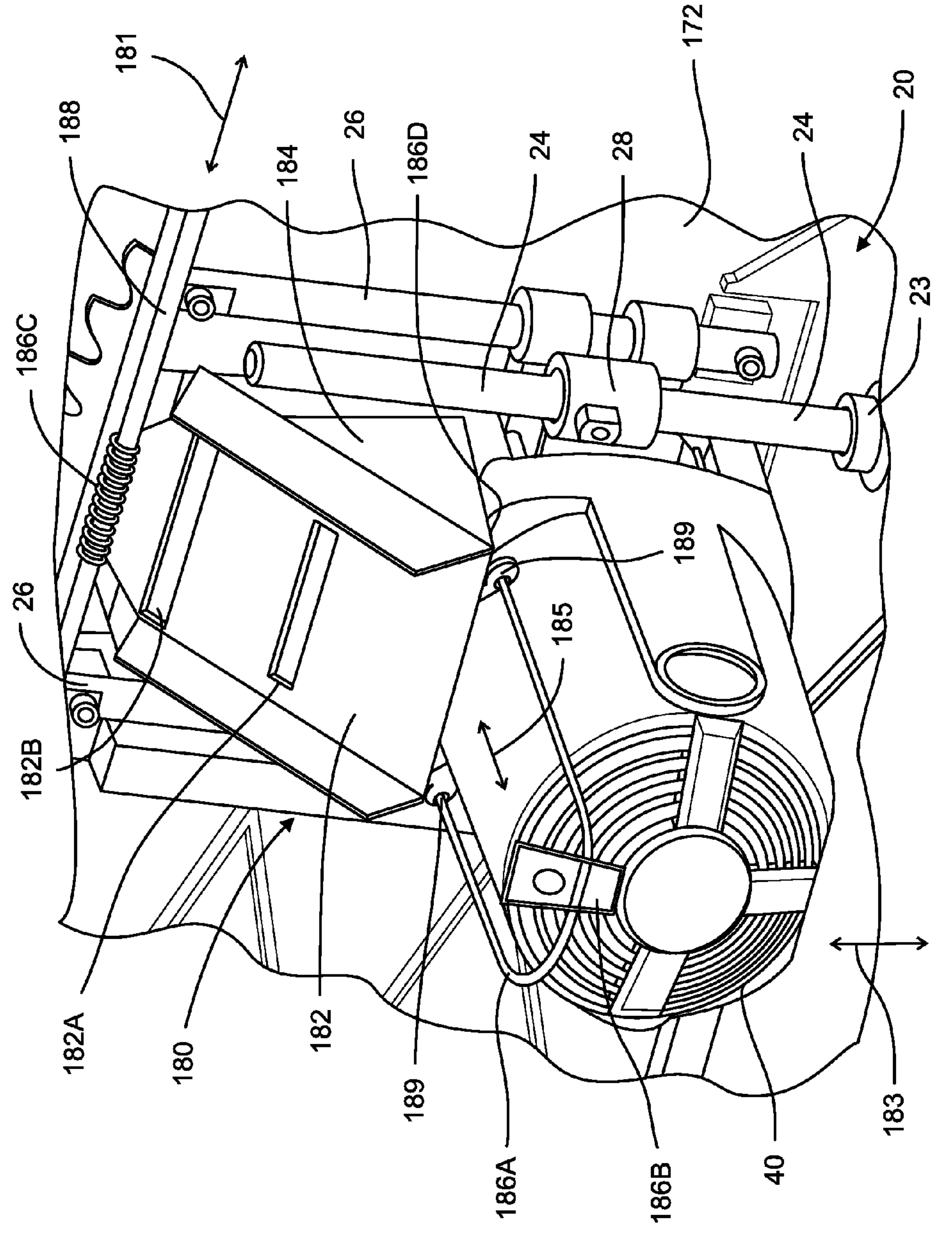
FIG. 3 depicts a perspective view of an embodiment of a guard system coupled to the motor and a top side of the blade case top of FIG. 2 including a guard plate and a glide wire.

Referring to FIG. 3, an embodiment of a guard system 180 is depicted. The guard system 180 is optionally a spring-loaded guard system with guard members that pivot about a pivot axis 181. The guard system 180 includes guard members such as a top guard plate 182 and side plates 184 shaped in the form of triangles which are integrally formed on opposite sides of the top guard plate 182 forming a unitary U-shaped structure providing added rigidity.

The guard system 180 also includes a glide wire (or a rail member) 186A, a clip 186B, and an optional torsion spring 186C. The glide wire 186A is a U-shaped structure and directs the top guard plate 182 with the side plates 184 to slide according to the predefined path of the glide wire 186A. The glide wire 186A is connected to the motor 40 by a three-point connection arrangement. The clip 186B connects the base of the U-shaped glide wire 186A to the motor 40, while the ends of the U-Shaped glide-wire 186A are connected to the motor 40 at mounting holes 186D positioned on opposite sides of the motor 40 (only one mounting hole 186D is depicted in FIG. 3). The optional torsion spring 186C urges the top guard plate 182 and side plates 184 downward toward the motor 40, while the glide wire 186A being coupled to the top guard plate 182 though glide holes 189 urges the top guard plate to glide with respect to the glide wire 186A or the top surface of the motor 40. The portion of the top guard plate 182 between the mounting holes 186D may be configured to remain in contact with the motor 40 by the urging of the spring 186C as the motor 40 moves vertically along an axis 183 with respect to the table top 2.

The top guard plate 182 with the side plates 184 are pivotably connected to the support wall 172 via a pivoting rod (or fastener) 188 which extends along the axis 181. On the top guard plate 182 windows 182A and 182B are provided for ventilation for the motor 40 (see FIG. 6) and an interface for an additional guard system 230 as will be described in more detail with respect to the guard system embodiments depicted in FIG. 6.

Also depicted in FIG. 3 is part of the height adjustment mechanism 20 including a beveled gear 23, a threaded rod 24 and the threaded member 28.

In operation when the beveled gear 23 is turned to raise and lower the motor 40 along the axis 183, the top guard plate 182 with the side plates 184 move about the glide wire 186A along an axis 185. While the motor 40 is depicted in an intermediate position along the axis 183, the reader should appreciate that the top guard plate 182 becomes substantially parallel with the table top 2 (see FIGS. 2 and 4) when the motor is at an up position (i.e., when the motor is raised to its highest possible vertical position), and the blade case 260 (see FIGS. 2 and 4) is not beveled or tilted with respect to the table top 2.

The interface between the top guard plate 182 and the glide wire 186A prevents a user from lifting the top guard plate 182 by overcoming the downward forces of gravity of the top guard plate 182 and the side plates 184 and the spring force of the optional torsion spring 186C. The clip 186B maintains the base of the U-shaped glide wire 186A near the end of the motor 40, and thereby prevents the base of the glide wire 186A to be raised above the motor 40 even if the user attempts to overcome the aforementioned downward forces. Since the guard plate 182 and the side plates 184 are constrained by the glide wire 186A, these structures limit access to the top portion of the blade 6 under the table top 2 and above the motor 40.

Figure 4:
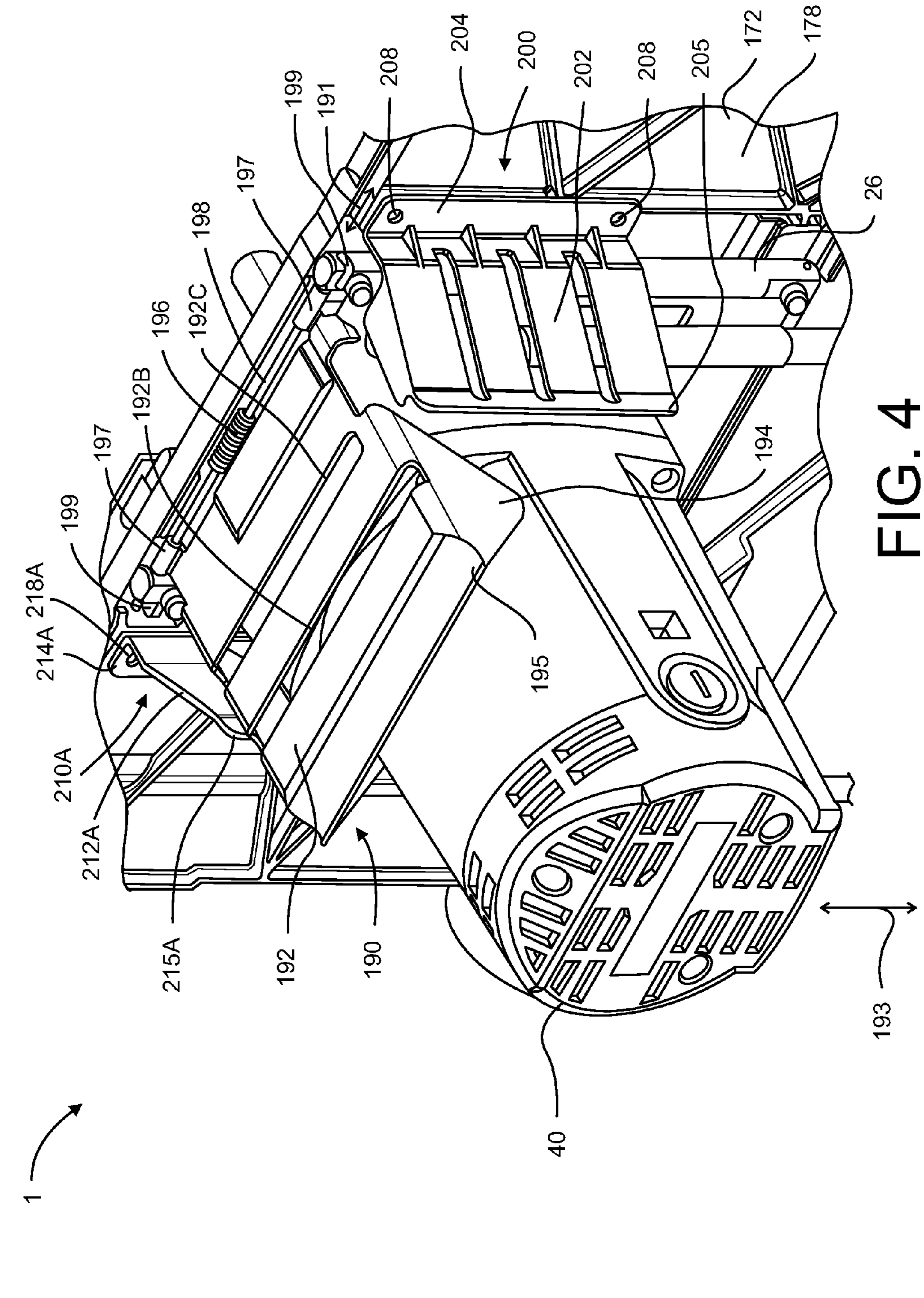
FIG. 4 depicts a perspective view of three guard systems coupled to the blade case of FIG. 2 for limiting access to various spaces around the motor.

Referring to FIG. 4, three guard systems 190, 200, and 210A are depicted. These guard systems are positioned about the motor 40 and limit a user's access to the area around the motor 40. The guard system 190 is a spring-loaded guard system with guard members that pivot about a pivot axis 191. It includes guard member such as a top guard plate 192, and side plates 194 shaped in the form of triangles which are integrally formed with the top guard plate 192 forming a unitary U-shaped structure providing added rigidity. The top guard plate 192 and the side plates 194 terminate at an arcuate end 195 which is urged to remain in contact with the motor via force of a torsion spring 196. A rod (or fastener) 198 which extends along the axis 191 terminates at the glide rails 26 by hooks or fasteners 199. The rod 198 also extends through the torsion spring 196. The top guard plate 192 further interfaces with the rod 198 via hinges (or slots) 197.

The top guard plate 192 includes windows 192A and 192B. The window 192B provides an interface cavity for a guard system 230, further described below (see FIG. 6). A ventilation window 192C (see FIG. 5A) is also positioned above the motor 40 to allow a motor fan 42 to ventilate air.

Figure 5B:
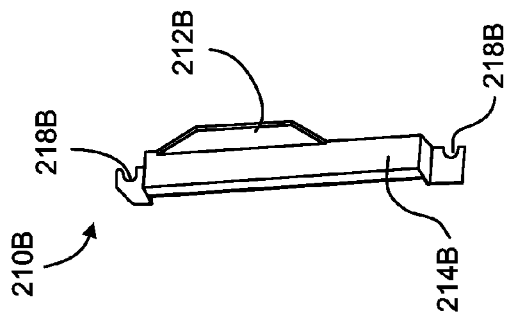
FIG. 5B depicts a perspective view of the alternative embodiment of the guard assembly of FIG. 4.
Figure 5A:
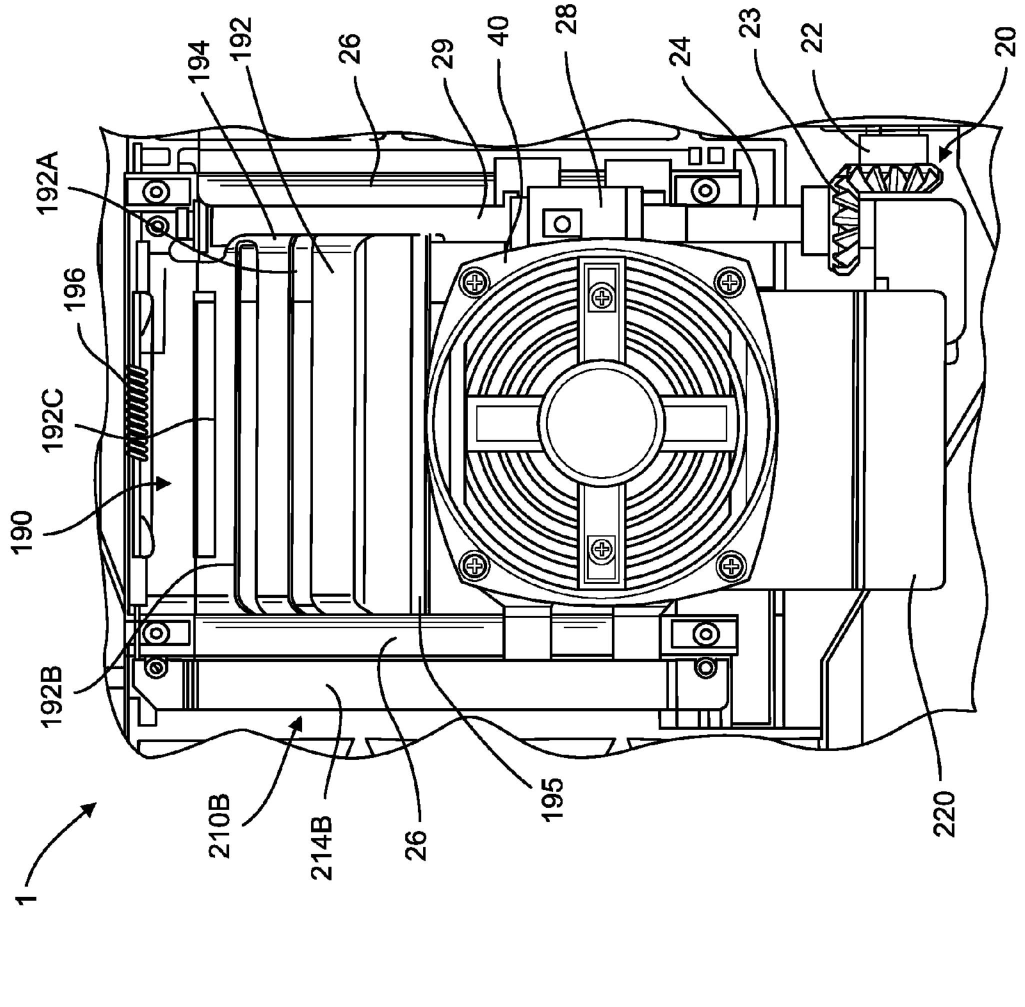
FIG. 5A depicts a plan view of a guard systems of FIG. 4, an alternative embodiment of a guard system of FIG. 4, and a motor lower guard.

In operation, the top guard plate 192 tilts downward when the motor 40 is lowered along an axis 193 from the up position (depicted in FIG. 4) to a down position (i.e., the lowered to the lowest possible position, depicted in FIG. 5A). In the up position, the top guard plate 192 tilts upward to an orientation that is substantially parallel with the table top 2 (see FIG. 2), when the blade case 260 (see FIG. 2) is not beveled or tilted with respect to the table top 2. During the vertical movement of the motor 40 along the axis 193, the bottom portion of the arcuate end 195 remains in contact with the motor 40 to limit access to the space above the motor 40.

The guard system 200 and 210A are stationary guard systems that are positioned about the sides of the motor 40. These systems include guard members such as guard plates 202 and 212A and side plates 204 and 214A which are integrally formed with the guard plates 202 and 212. The guard plates 202 and 212A terminate at arcuate ends 205 and 215A and are connected to the wall 172 via mounting holes 208 and 218A, respectively. The guard systems 200 and 210A are so dimensioned and are thereby configured to limit access to the space around the sides of the motor 40 when the motor 40 is vertically moved from the up position (depicted in FIG. 4) to the down position along the axis 193.

Referring to FIG. 5A a plan view of the motor 40 and the guard system 190 is depicted in the down position. As described above, the window 192C provides ventilation for the motor 40. The window 192C as well as windows 192A (depicted in FIG. 5A) and 192B are sufficiently small to limit access to the space above the motor through the windows. However, these windows are sufficiently large to allow ventilation and interface by another guard system, further described below.

Also depicted in FIG. 5A is a motor lower guard 220 connected to the motor 40 for limiting access to the bottom side of the motor. The motor lower guard 220 also limits dust and debris generated during cutting operations from entering into the motor 40, as described in a U.S. patent application Ser. No. 12/856,568, incorporated herein by reference in its entirety.

Further depicted in FIG. 5A, and more clearly shown in FIG. 5B, is an alternative embodiment 210B of the stationary guard system 210A depicted in FIG. 4. The stationary guard system 210B includes guard members such as a guard plate 212B and a side plate 214B which is integrally formed with the guard plate 212A. The guard plate 212B terminates at an arcuate end 215B and is connected to the wall 172 via mounting holes 218A. The guard systems 210B is so dimensioned and is thereby configured to limit access to the space around the sides of the motor 40 when the motor 40 is vertically moved from the up position (depicted in FIG. 4) to the down position (depicted in FIG. 5A) along the axis 193 (see FIG. 4).

Figure 6:
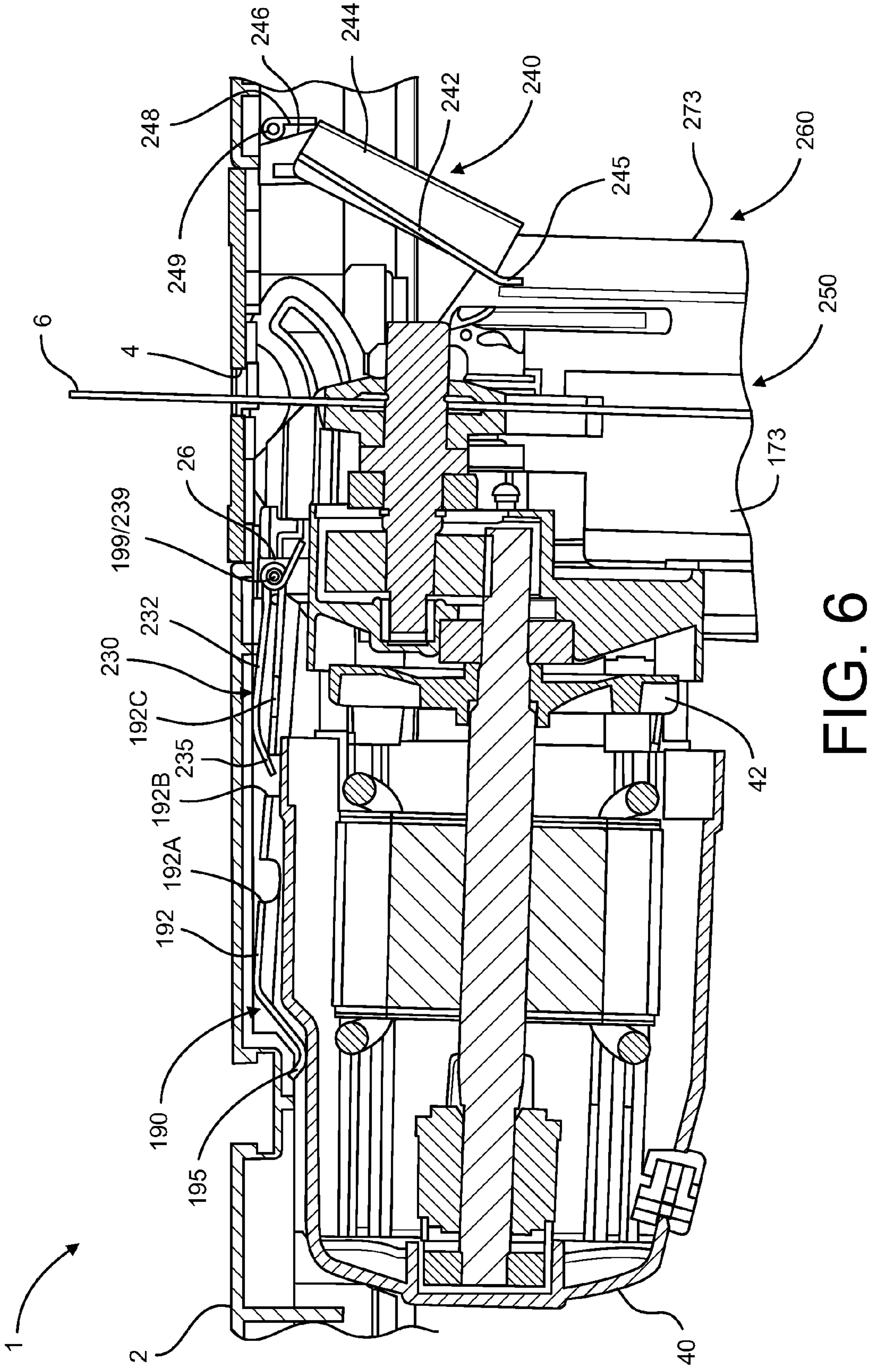
FIG. 6 depicts a plan view of the motor raised to the highest position with respect to the table top of FIG. 2 with one of the guard systems of FIG. 4 as well as two additional spring-loaded guard systems.
Figure 7:
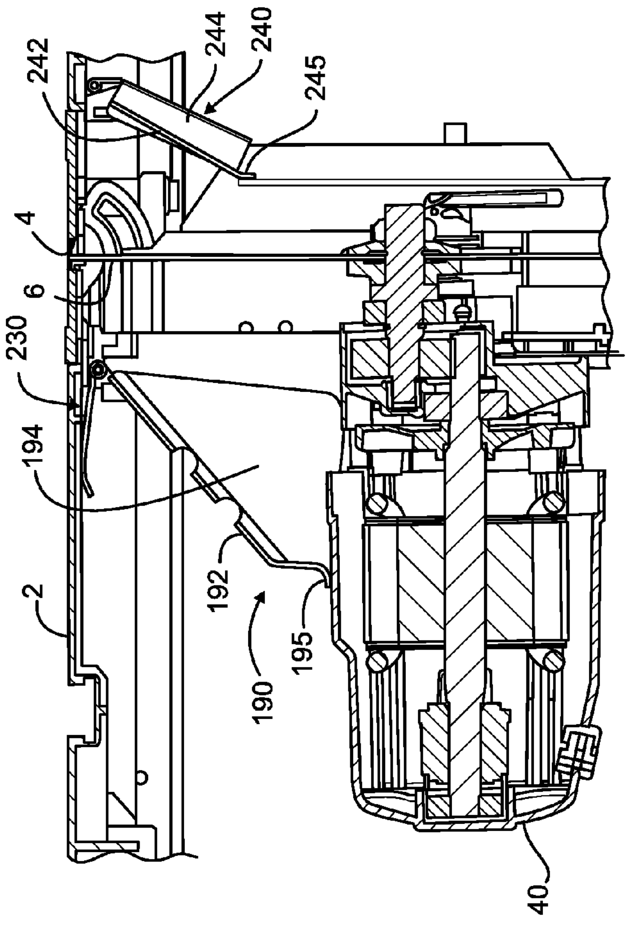
FIG. 7 depicts a plan view of the guard systems of FIG. 6 with the motor lowered substantially to the lowest position with respect to the table top of FIG. 2.
Figure 8:
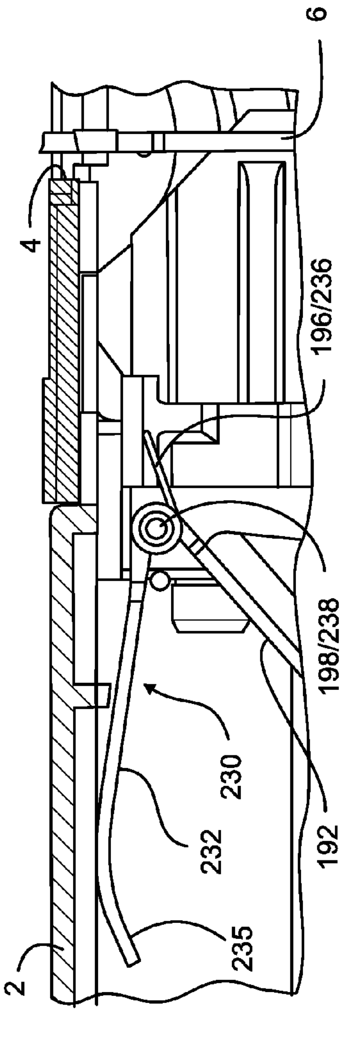
FIG. 8 depicts a close-up plan view of one of the guard systems of FIG. 6.

Referring to FIGS. 6, 7, 8, and 9, side views of parts of the table saw assembly 1 are depicted. In FIG. 6, the motor 40 is depicted in the up position, such that the blade 6 is extended above the table top 2 through the saw blade opening 4. In FIG. 7, the motor 40 is depicted in the down position such that the saw blade 6 is completely below the table top 2.

While the guard systems 190, 200, 210A, 210B and 220 are positioned about the motor to limit access to the space above, the space around the sides, and the space below the motor 40, respectively, a guard system 230 (depicted in FIGS. 6, 7, and 8) and a guard system 240 (depicted in FIGS. 6, 7, and 9), limit access between the blade case 260 and the bottom of the table top 2 (i.e., the space defined by the air gap 148).

The guard system 230 is a spring-loaded guard system with guard members that pivot about a pivot axis 191 (see FIG. 4). It includes guard members such as a guard plate 232 which spans substantially the width of the blade case 260 (see FIG. 11C), and optional side plates (not shown) which may be integrally formed with the guard plate 232 forming a unitary U-shaped structure providing added rigidity. The guard plate 232 and the side plates (not shown) terminate at an arcuate radially curved end or a sliding end 235 which is urged to remain in contact with the bottom side of the table top 2 via a torsion spring 236 (see FIG. 8). The torsion springs 196 and 236 may be shared between the guard systems 190 and 230. A rod (or fastener) 238 (see FIG. 8) which extends along the axis 191 terminates at the glide rails 26 by terminating fasteners 239. The rod 238 also extends through the torsion spring 236. The guard plate 232 further interfaces with the rod 238 via hinges or slots (not shown).

Figure 10:
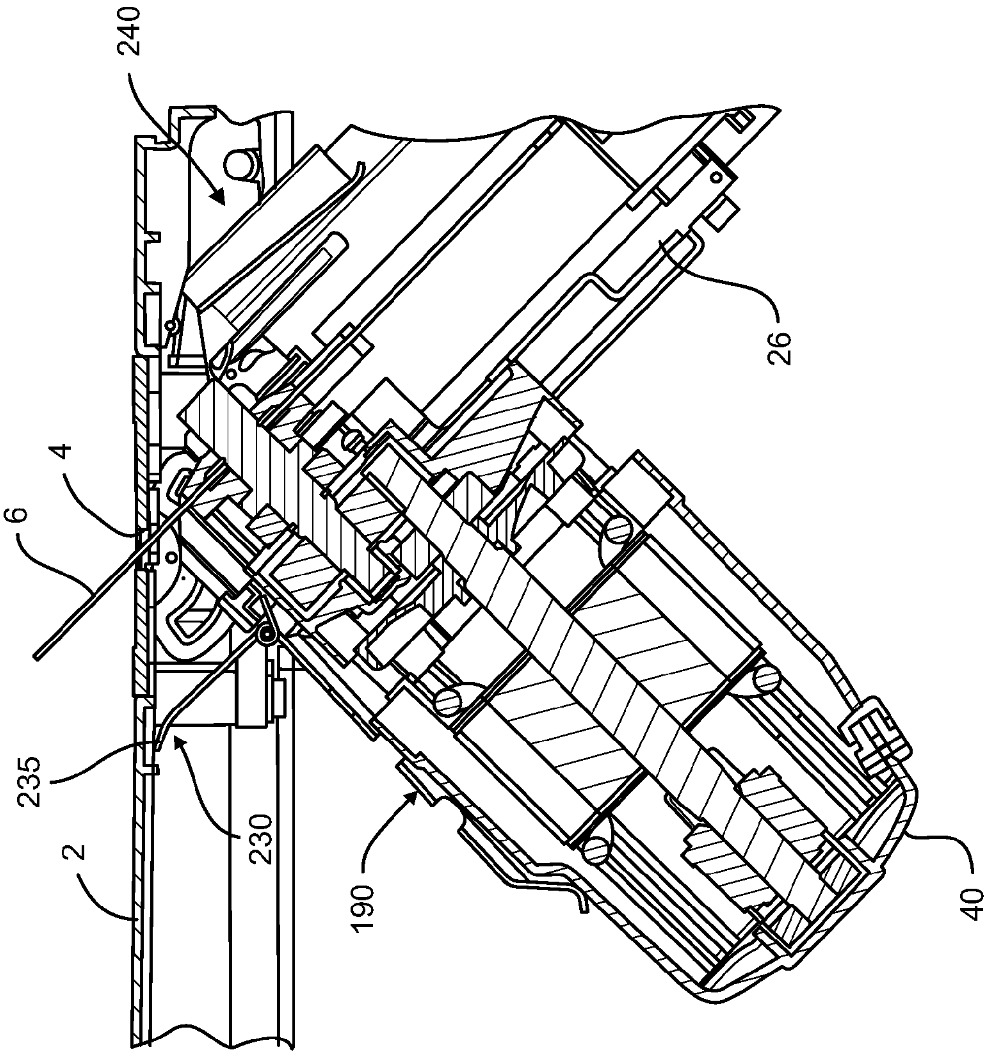
FIG. 10 depicts a plan view of the motor raised substantially to the highest position with respect to the table top of FIG. 2 and beveled substantially to the most obtuse bevel angle with respect to the table top of FIG. 2, while depicting the guard systems of FIG. 7.

In operation, the guard plate 232 tilts with respect to the bottom of the table top 2 when the blade case 260 is beveled so that the saw blade 6 is moved along the arcuate path B-B (see FIG. 1) from a square or upright position (i.e., where the blade case 260 is substantially perpendicular to the table top 2 (see FIG. 2) to a beveled or tilted position (for example, 45 degrees of bevel, see FIG. 10). In the square position, the guard plate 232 tilts leftward (with respect to FIG. 6, for example) to an orientation that is substantially parallel with the table top 2 (see FIGS. 6, 7, and 8). In this position, the arcuate radially curved end 235 of the guard system 230 fits inside the window 192B of the guard system 190 to prevent interference between these systems as well as to limit access to the internal components. In the beveled position (see FIG. 10), the guard plate 232 tilts rightward (with respect to FIG. 6, for example) to an orientation that is tilted to the table top 2. During the beveling movement of the blade case 260, the top portion of the arcuate radially curved end 235 remains in contact with the bottom side of the table top 2 to limit access to the space defined by the air gap 148 (see FIG. 2).

Figure 9:
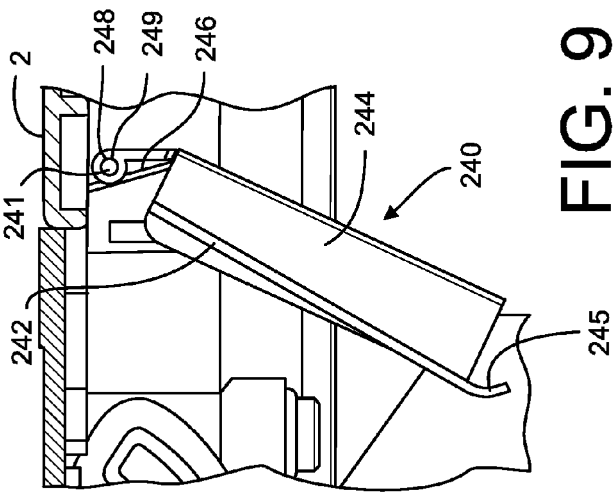
FIG. 9 depicts a close-up plan view of one of the spring-loaded guard systems of FIG. 6.

The guard system 240 is also a spring-loaded guard system with guard members that pivot about a pivot axis 241 (the pivot axis 241 comes in and out of the page, see FIG. 9). It includes guard members such as a guard plate 242 which spans the width of the blade case 260, and side plates 244 which are integrally formed with the guard plate 242. The guard plate 242 and the side plates 244 terminate at an arcuate radially curved end 245 which is urged to remain in contact with the blade case 260 via a torsion spring 246 (see FIGS. 6 and 9). A rod (or fastener) 248 (see FIG. 8) which extends along the axis 241 terminates at the bottom side of the table top 2 by terminating fasteners 249. The rod 248 also extends through the torsion spring 246. The guard plate 242 further interfaces with the rod 248 via hinges or slots (not shown).

In operation, the guard plate 242 tilts with respect to the blade case 260 when the blade case 260 is beveled from the square position to the substantial beveled position (see FIG. 10). In the square position, the guard plate 232 tilts leftward (with respect to FIG. 6, for example) to an orientation that is substantially perpendicular with the table top 2 (see FIGS. 6, 7, and 9) and only the left side of the arcuate end 245 is in contact with the blade case 260. In the beveled position (see FIG. 10), the guard plate 232 tilts rightward (with respect to FIG. 6, for example) to an orientation where substantially all of the guard plate 242 contacts the blade case 260. Since during the entire beveling movement of the blade case 260, the left portion of the arcuate end 245 remains in contact with the blade case 260, access is limited to the space by the air gap 148 (see FIG. 2).

Figure 11B:
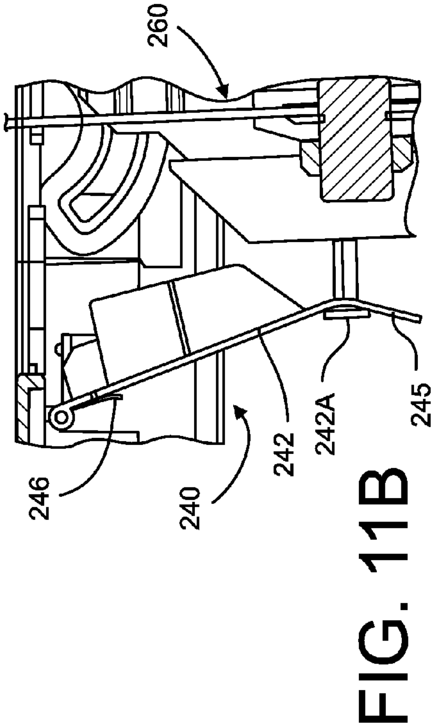
FIGS. 11A, 11B, and 11C depict various limiting devices further cooperating with the guard systems of FIG. 6 for limiting access to internal compartments of the saw assembly of FIG. 1.
Figure 11A:
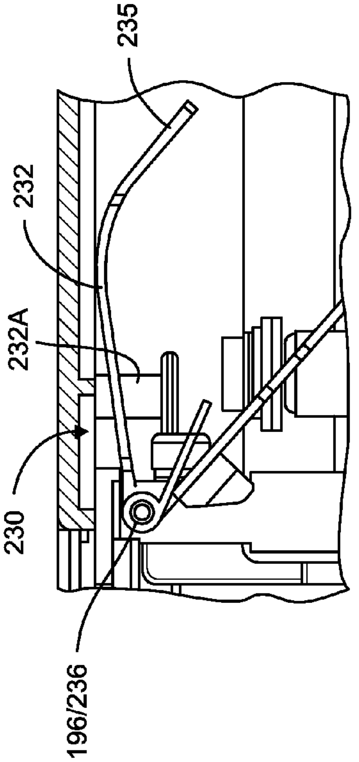
Figure 11C:
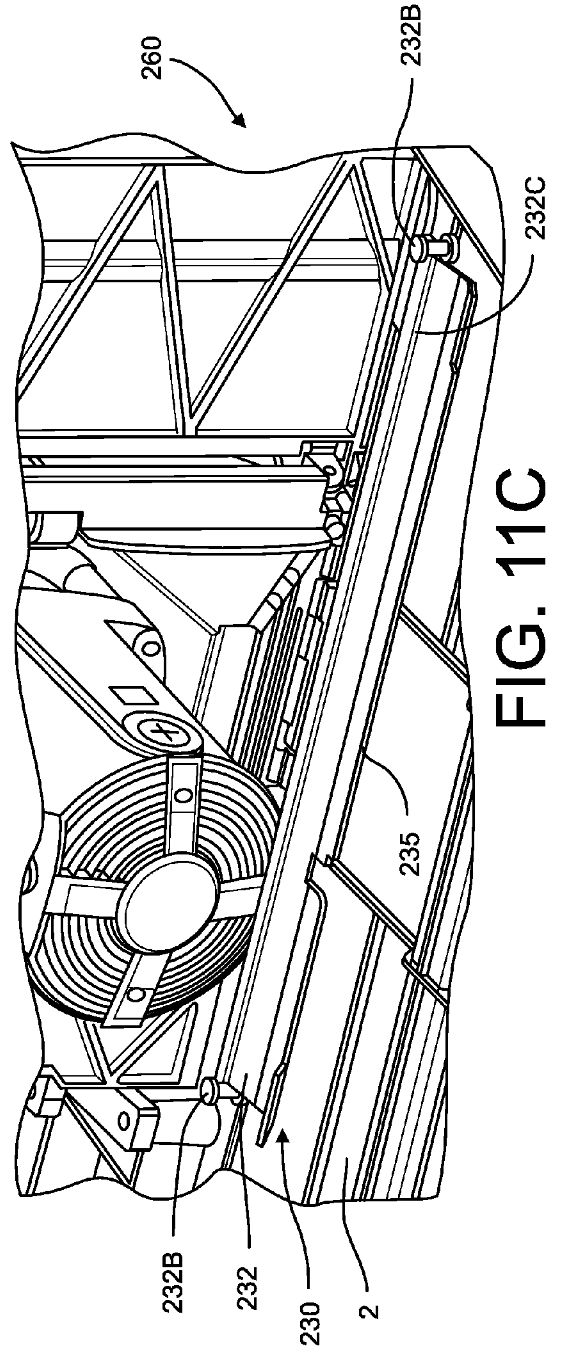

Referring to FIGS. 11A, 11B, and 11C, devices are depicted for limiting movement of the guard systems 230 and 240. These guard plates 232 and 242 of these systems are urged to make contact with the bottom side of the table top 2 and the blade case 260, respectively, by the urging of the associated torsion springs (236 and 246). Travel limiting member are provided to avoid a situation where a user can overcome the force of these springs and thereby reach inside the internal compartments of the saw assembly 1. In FIG. 11A, a shoulder screw or pin 232A is depicted which extends through the guard plate 232. The shoulder screw or pin 232A limits downward movement of the guard plate 232. Similarly, as depicted in FIG. 11B, a shoulder screw or pin 242A is depicted which extends through the guard plate 242. The shoulder screw or pin 242A limits leftward movement of the guard plate 242 with respect to FIG. 11B. In FIG. 11C, an alternative embodiment to the shoulder screw 232A is depicted. Fasteners 232B are positioned at opposite ends of the guard plate 232 and a cable or rod 232C is fastened between them. The cable or rod 232C limits how much the guard plate 232 may be pulled away from the bottom side of the table top 2. As an alternative embodiment to the shoulder screw 242A, a cable or rod assembly (not shown) similar to the fasteners 232B and the cable 232C can be configured to also limit how far the guard plate 242 can pivot away from the blade case 260. The shoulder screws 232A and 242A, as well as the fasteners 232B may require a specialty tool to prevent unauthorized removal of these limiting devices.

Figure 12:
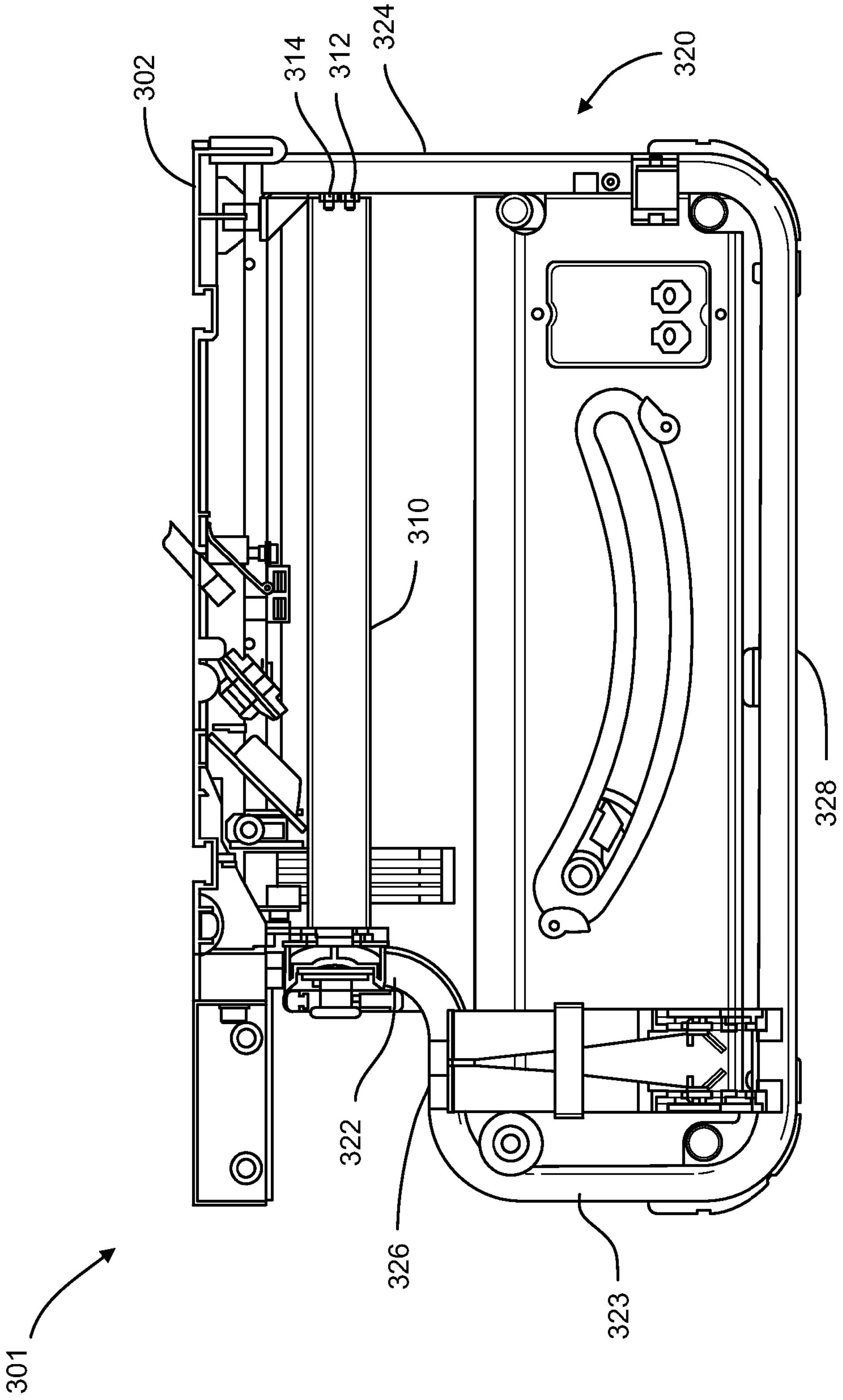
FIG. 12 depicts a guard plate positioned on a frame of a table saw according to an embodiment of the present disclosure.
Figure 13:
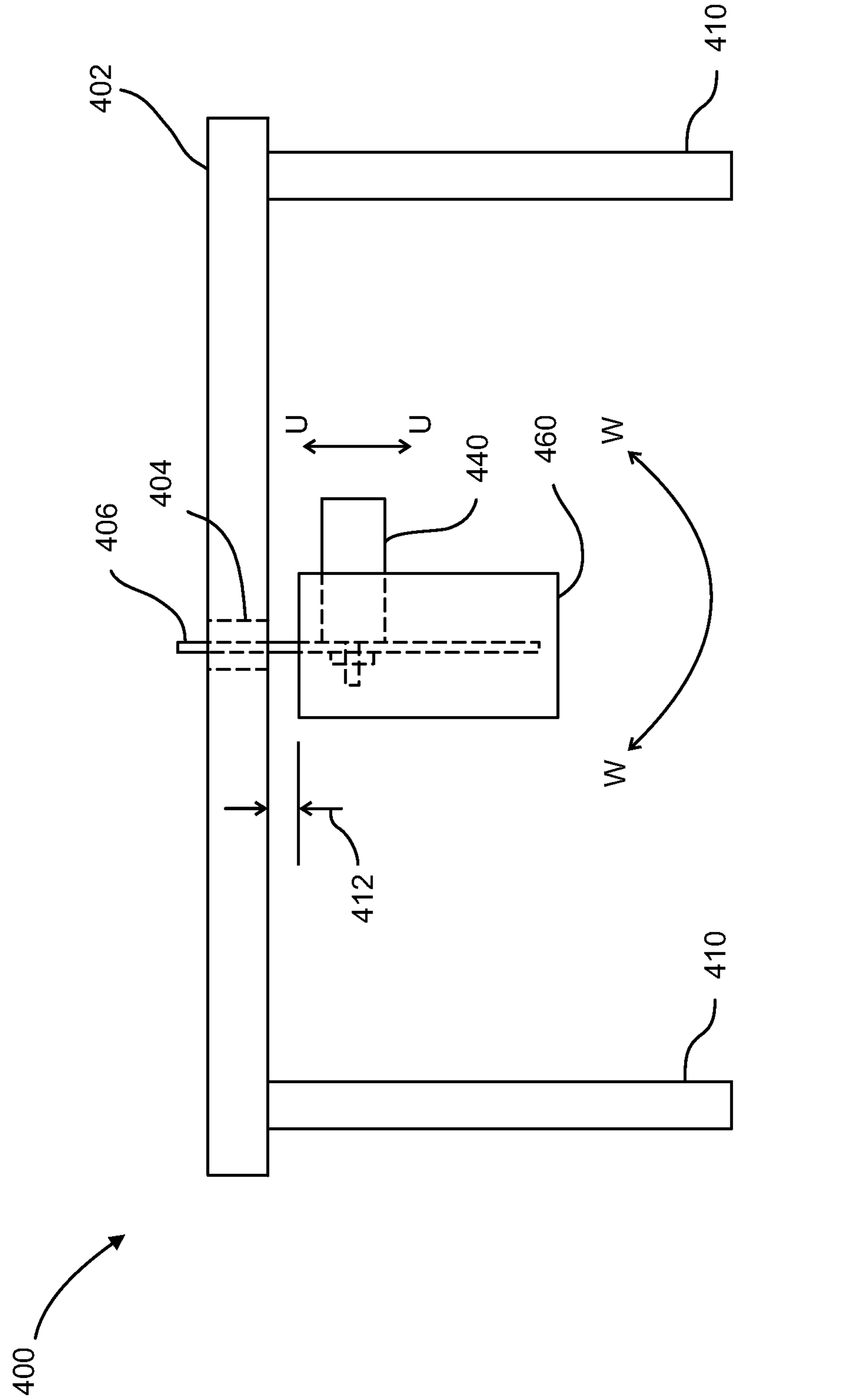
FIG. 13 PRIOR ART
FIG. 13 depicts a plan view of a prior art table saw.

Referring to FIG. 12 an alternative embodiment of a table saw assembly 301 is depicted. The table saw assembly 301 is described in a U.S. patent application Ser. No. 12/834,795, incorporated herein by reference in its entirety. The table saw assembly 301 includes a front leg unit 320 and a rear leg unit (not shown, opposite the front leg unit 320). The front leg unit 320 includes downwardly extending leg portions 322, 323, and 324 as well as transversely extending leg portions 326 and 328.

Between the downwardly extending legs 322 and 324, a guard system 310 is depicted. The guard system is of the stationary type and includes a guard plate 312 and side plates 314 integrally formed with the guard plate 312 forming a U-shaped structure for added rigidity. The side plates 314 include mounting holes for mounting the guard system 310 to the downwardly extending legs 322 and 324 via fasteners 314. The guard plate 312 is configured to limit access to the compartments of the table saw assembly 301.

The guard plates of the spring-loaded pivoting type of the internal guard systems described above (for example, the guard plate 242 of the internal guard assembly 240), may be further configured to pivot away from respective mating surfaces (for example, the blade case 260) to allow limited access for the user.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A table saw comprising:

a table top including an opening configured to receive a saw blade having a surface defining a surface plane and configured to rotate about a blade rotational axis;

a blade case positioned under the table top, the blade case including an interior portion with the saw blade partially positioned within the interior portion, the blade case configured to move relative to the table top;

a motor coupled to the saw blade and configured to move relative to the table top, the motor configured to rotate the blade about the blade rotational axis; and at least one moveable guard member positioned between the table top and the blade case, the at least one moveable guard member providing an obstruction to the interior portion of the blade case, and the at least one moveable guard member configured to pivot about a guard member pivot axis when the motor is moved between an up position and a down position or tilted relative to the table top, wherein the guard member pivot axis is disposed substantially parallel to the surface plane of the saw blade and is substantially perpendicular to the rotational axis, the at least one moveable guard member including a first guard member positioned above the motor, the first guard member configured to pivot about the guard member pivot axis between a relatively horizontal position when the motor is in the up position and an inclined position when the motor is in the down position, wherein the first guard member is a plate member including a first edge and a terminating end includes an opposite second edge, wherein the guard member pivot axis for the first guard member is provided along the first edge, and wherein the second edge is configured to slide relative to the motor along an axis disposed substantially parallel to the blade rotational axis and between the blade rotational axis and the guard member pivot axis when the motor is moved between the up position and the down position.

2. The table saw of claim 1 wherein the motor is moveably coupled to the blade case.

3. The table saw of claim 2 wherein the motor is coupled to at least one glide member fixed to the blade case, wherein the motor is configured to slide along the glide member when the motor moves between the up position and the down position, and wherein the guard member pivot axis extends through the at least one glide member.

4. The table saw of claim 1 wherein the motor and blade case are configured to move together between an upright position and a tilted position, wherein the blade is substantially perpendicular to the table top when the motor and blade case are in the upright position, and wherein the blade is tilted relative to the table top when the motor and blade case are in the tilted position.

5. The table saw of claim 4 wherein the at least one moveable guard member further includes a second guard member positioned above the motor, the second guard member configured to pivot between a relatively horizontal position when the motor and blade case are in the upright position and an inclined position when the motor and blade case are in the tilted position.

6. The table saw of claim 5 wherein the at least one moveable guard member further includes a third guard member positioned on an opposite side of the blade case from the second guard member, wherein the third moveable guard member is configured to pivot when the motor and blade case are moved between the upright position and the tilted position.

7. The table saw of claim 6 wherein the second guard member is a second plate member and the third guard member is a third plate member, wherein the third plate member includes a lip configured to slide along a surface of the blade case when the motor and blade case are moved between the upright position and the tilted position.

8. The table saw of claim 7 further comprising a plurality of fixed guard members secured to the blade case, each of the fixed guard members providing an obstruction to the interior portion of the blade case.

* * * * *